(12) United States Patent
Suau et al.

(10) Patent No.: US 8,541,500 B2
(45) Date of Patent: Sep. 24, 2013

(54) CARDANOL-BASED ASSOCIATIVE POLYURETHANES, CORRESPONDING ASSOCIATIVE THICKENERS AND USES THEREOF

(75) Inventors: Jean-Marc Suau, Lucenay (FR); Denis Ruhlmann, Genay (FR)

(73) Assignee: Coatex S.A.S., Genay (FR)

( * ) Notice: Subject to any disclaimer, the term of this patent is extended or adjusted under 35 U.S.C. 154(b) by 125 days.

(21) Appl. No.: 12/859,525

(22) Filed: Aug. 19, 2010

(65) Prior Publication Data

US 2011/0060101 A1 Mar. 10, 2011

Related U.S. Application Data

(60) Provisional application No. 61/244,354, filed on Sep. 21, 2009.

(30) Foreign Application Priority Data

Sep. 10, 2009 (FR) ...................................... 09 56199

(51) Int. Cl.
*C08L 75/00* (2006.01)
*C08G 18/10* (2006.01)
*C08G 18/00* (2006.01)

(52) U.S. Cl.
USPC ................................ 524/590; 528/59; 528/65

(58) Field of Classification Search
USPC ...................................... 524/590; 528/59, 65
See application file for complete search history.

(56) References Cited

U.S. PATENT DOCUMENTS

| 4,155,892 | A | * | 5/1979 | Emmons et al. | 524/507 |
| 5,977,398 | A | * | 11/1999 | Komiya | 560/25 |
| 7,217,761 | B2 | | 5/2007 | Ruhlmann et al. | |
| 2005/0192423 | A1 | | 9/2005 | Niesten et al. | |
| 2007/0066752 | A1 | | 3/2007 | Ruhlmann et al. | |
| 2008/0139685 | A1 | * | 6/2008 | Reese et al. | 521/174 |

FOREIGN PATENT DOCUMENTS

FR 2 826 014 A1 12/2002

OTHER PUBLICATIONS

"Synthesis and deblocking of cardanol- and anacardate-blocked toluene diisocyanates" Nasar et.a.l, Journal of Polymer Science Part A: Polymer Chemistry, vol. 42, issue 16 (Aug. 15, 2004), p. 4047-4055.*
Surfactant Properties and Biodegradation of Polyethoxylates from Phenolic Lipids, Tyman et. al., Journal of Surfactants and Detergents, vol. 7, No. 2., 2004, p. 169-173.*
International Search Report issued Aug. 19, 2011, in PCT/IB2010/002177 with English translation of category of cited documents.
U.S. Appl. No. 13/495,115, filed Jun. 13, 2012, Suau, et al.
U.S. Appl. No. 13/495,080, filed Jun. 13, 2012, Suau, et al.

* cited by examiner

*Primary Examiner* — Ling-siu Choi
*Assistant Examiner* — Aiqun Li
(74) *Attorney, Agent, or Firm* — Oblon, Spivak, McClelland, Maier & Neustadt, L.L.P.

(57) ABSTRACT

New associative polyurethanes which are manufactured with cardanol which is potentially oxyethylated. Use of these polyurethanes as thickening agents for aqueous formulations.

18 Claims, No Drawings

CARDANOL-BASED ASSOCIATIVE POLYURETHANES, CORRESPONDING ASSOCIATIVE THICKENERS AND USES THEREOF

REFERENCE TO PRIOR APPLICATIONS

This application claims priority to U.S. provisional application 61/244,354 filed Sep. 21, 2009, and to French patent application 09 56199 filed Sep. 10, 2009, both incorporated herein by reference.

FIELD OF THE INVENTION

The present invention pertains to the field of associative thickeners, and more particularly HEUR (Hydrophobically modified Ethylene oxide URethane) associative thickeners used in aqueous formulations. These products are intended to be implemented in aqueous formulations such as paints.

The main objects of the invention described here include new HEUR thickeners which implement a cardanol-based monomer, a bio-sourced raw material. This results in the development of a new line of rheological additives which make it possible to efficiently thicken a water-based paint over a large range of shear gradients, without altering its pigment compatibility.

BACKGROUND OF THE INVENTION

The formulations of water-based paints containing mineral loads are made up of an aqueous phase, one or more polymers in an emulsion in the liquid phase known as binders, loads, and/or pigments, a dispersing agent, and admixtures as diverse as surface-active agents, coalescence agents, biocides, anti-foaming agents, and finally, a thickening agent.

This thickening agent makes it possible to control the rheology of the aqueous formulations which it is added to, and particularly water-based paints, both during the stage of their manufacture, and during their transportation, storage, or implementation. The diversity of the practical constraints within each of these steps is due to a variety of different rheological behaviors.

However, the need of the person skilled in the art may be summarized as achieving the effect of thickening the aqueous formulation, both for reasons of stability over time and for a possible application of the paint onto a vertical surface, the absence of splashing at the time of implementation, etc. This is why additives which contribute to this regulation of the rheological behavior have been designated as thickeners.

Among these products, so-called "associative" thickeners are distinguished, which are water-soluble polymers with insoluble hydrophobic groups. Such macromolecules have an associating nature: once added to water, the hydrophobic groups may assemble into micellar aggregates. These aggregates are bound to one another by the hydrophilic parts of the polymers: a three-dimensional network is thereby formed, which causes the medium's viscosity to increase.

The associative thickeners' operating mechanism and characteristics are currently well-known and described, for example, in the documents "Rheology modifiers for waterborne paints" (Surface Coatings Australia, 1985, pp. 6-10) and "Rheological modifiers for water-based paints: the most flexible tools for your formulations" (Eurocoat 97, UATCM, vol. 1, pp 423-442).

Among these associative thickeners, there is the class of HEUR (Hydrophobically modified Ethylene oxide URethane) associative thickeners. They designate copolymer resulting from synthesis between a polyalkylene glycol compound, a polyisocyanate, and a so-called "associative" alkyl or aryl or arylalkyl monomer made up of a hydrophobic terminal group.

These structures are well-known for developing high Brookfield™ viscosities with a low shear gradient (J. of Applied Polymer Science, vol. 58, p 209-230, 1995; Polymeric Mat. Sci. and Engineering, vol. 59, p 1033, 1988; Polymeric Mat. Sci. and Engineering, vol. 61, p 533, 1989; Polymeric Paint Colour Journal, vol. 176, n° 4169, p 459, June 1986). Numerous examples of this are found in the literature, in which is later discussed the choice of the hydrophobic terminal group, which has a major effect on the end polymer's rheological properties.

Within the context of a cosmetics composition, the document EP 1,584,331 discloses a hydrophobic terminal group having 6 to 34 carbon atoms. The document EP 0,905,157 describes branched chains having 2 to 14 carbon atoms, in view of improving the transparency of the paint films produced in the presence of such thickeners. The document WO 02/102868 describes the use of plurystyrylphenols, which make it possible to improve pigment compatibility. In order to specifically increase the Brookfield™ viscosity, the document EP 0,639,595 discloses linear hydrophobic groups having 4 to 36 carbon atoms.

It is currently known that the more carbon atoms are present in the hydrophobic terminal group's chain(s), the greater the viscosity, and particularly the Brookfield™ viscosity with a low shear gradient (see document WO 02/102868 on page 5). Indeed, the size of the hydrophobic groups will affect the size of the micellar aggregates that they cause once in a solution, which is directly related to an increase in viscosity, as described in the document "Rheology modifiers for water-borne paints" (Surface Coatings Australia, 1985, pp. 6-10).

With regard to the prior art, the number of carbon atoms carried by the hydrophobic group in order to achieve "effective" thickening behavior may be numbered as "at least 16" and preferentially "at least 20". In addition to this years-old technical requirement, an environmental restriction has more recently been added: this is the requirement to have biosourced products, meaning products not derived from fossil fuels. This approach is in keeping with the concepts of green chemistry and sustainable development.

SUMMARY OF THE INVENTION

In this area, science has unfortunately not progressed far, and there is currently a high demand for HEUR associative thickeners with a terminal hydrophobic group having at least 20 carbon atoms, which is bio-sourced.

Through their research in this field, the inventors have successfully developed new structures of this type. They are water-soluble polyurethanes, resulting from the condensation:

of cardanol, potentially oxyalkylated, and potentially of at least one oxyalkylated alcohol, and at least one polyisocyanate.

DETAILED DESCRIPTION OF THE PREFERRED EMBODIMENTS

Cardanol, whose chemical formula (I) appears below and which contains 21 carbon atoms, is obtained from anacardic acid, the main component in cashew nut oil. It is currently used industrially in resins (CN 101319042, KR 100559055), foams (US 2006 004115, EP 1,765 901), dispersing agents (US 2004 050752), and detergents (WO 92/21741).

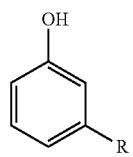

Formula (I)

R = C15H31-n
n = 0, 2, 4, 6

Nothing in the state of the art suggested that such structures could be used to manufacture associative monomers, which are used in the composition of HEUR associative thickeners. Thus, a nonpolluting raw material is refined, which is not derived from a fossil fuel, and which is easily available in large quantities.

Additionally, it turns out that said thickeners lead to particularly beneficial rheological behaviors when they are used in aqueous compositions. As demonstrated by the tests which illustrate, but which do not limit, the present invention, a thickening effect is achieved over a large interval of shear gradients: it is therefore possible to offer a true range of products to the end-user. Finally, the pigment compatibility is not deteriorated, even though this is the case with most polyurethane thickeners of the prior art.

Thus, the end product is a HEUR thickener which is particularly effective within the aqueous compositions into which it is added, and which has a monomer terminated by a hydrophobic group having more than 20 carbon atoms, potentially oxyalkylated, said hydrophobic group being biosourced and nonpolluting.

Therefore, a first object of the invention is water-soluble polyurethanes resulting from the condensation:
  a) of cardanol, optionally oxyalkylated, and optionally of at least one oxyalkylated alcohol other than oxyalkylated cardanol, and
  b) at least one polyisocyanate.

The manufacture of these polyurethanes, now that the ingredients have been specified, which belong to the family of HEUR thickeners, is known to the person skilled in the art, who may refer for example to the documents mentioned above in the background of the present invention.

The water-soluble polyurethanes of the invention result from the condensation of, expressed as a percentage by weight of each of the monomers, any amounts of a) and b) above, the sum of these percentages preferably being equal to 70, 80, 90 and 100%. For example, the water-soluble polyurethanes of the invention can result from the condensation on a weight basis based on total weight of 70-99.9% of cardanol, optionally oxyalkylated, and optionally of at least one oxyalkylated alcohol other than oxyalkylated cardanol, and 0.1% to 30% of at least one polyisocyanate, the sum of these percentages preferably being equal to 100%. For a) it is preferred that at least 50% of the total weight of a) be cardanol, optionally oxyalkylated, or a mixture thereof.

A water-soluble polyurethane according to the invention resulting from the condensation of:
  cardanol, optionally oxyalkylated, and optionally of at least one oxyalkylated alcohol that is not oxyalkylated cardanol, and
  at least one polyisocyanate
preferably consists of, or consists essentially of, the listed ingredients therein on a total weight basis. However, this is not required. In certain preferred embodiments the water-soluble polyurethanes according to the invention comprise at least 70% of the ingredients specified, more preferably 75, 80, 85, 90, 95, 99, and 100% of the ingredients specified, on a total weight basis.

Preferred variants of the invention will now be described, which are not exhaustive.

In a first variant, the water-soluble polyurethanes result from the condensation:
  of cardanol and a polyalkylene glycol,
  and at least one polyisocyanate.

In a second variant, the water-soluble polyurethanes result from the condensation:
  of oxyalkylated cardanol and a polyalkylene glycol,
  and at least one polyisocyanate.

In a third variant, the water-soluble polyurethanes result from the condensation:
  of oxyalkylated cardanol,
  and at least one polyisocyanate.

In the first variant, the water-soluble polyurethanes result from the condensation of, expressed as a percentage by weight of each of the monomers, the sum of these percentages being equal to 100%:
  90% to 99.5% of cardanol and a polyalkylene glycol,
  and 0.5% to 10% of at least one polyisocyanate.

In the second variant, the water-soluble polyurethanes result from the condensation of, expressed as a percentage by weight of each of the monomers, the sum of these percentages being equal to 100%:
  90% to 99.5% of oxyalkylated cardanol and a polyalkylene glycol,
  and 0.5% to 10% of at least one polyisocyanate.

In the third variant, the water-soluble polyurethanes result from the condensation of expressed as a percentage by weight of each of the monomers, the sum of these percentages being equal to 100%:
  90% to 99.5% of oxyalkylated cardanol,
  and 0.5% to 10% of at least one polyisocyanate.

The polyurethanes of the invention are further characterized in that the polyalkylene glycol is preferentially polyethylene glycol, preferentially a polyethylene glycol whose molecular mass by weight is between 2,000 g/mole and 20,000 g/mole, preferentially between 8,000 g/mole and 15,000 g/mole, and very preferentially between 8,000 g/mole and 12,000 g/mole.

The polyurethanes of the invention are further characterized in that the polyisocyanate is preferably chosen from among 1,4-butane di-isocyanate, 1.6-hexane diisocyanate, isophorone diisocyanate, 1,3- and 1.4-cyclohexane diisocyanate, 4,4'diisocyanatodicyclohexylmethane, 1-methyl-2.4-diisocyanatocyclohexane and its mixture with 1-methyl-2.6-diisocyanatocyclohexane, the biuret of hexamethylene diisocyanate, the trimer of hexamethylene diisocyanate, and the trimer of isophorone diisocyanate and mixtures thereof.

The polyurethanes of the invention are further characterized in that the cardanol, when it is oxyalkylated, is preferentially oxyethylated with a number of ethylene oxide units between 1 and 100, preferentially between 5 and 60.

A second object of the present invention is the use of said polyurethanes, as thickening agents within an aqueous composition, said composition being preferentially chosen from among an aqueous paint, a lacquer, a varnish, a paper coating, a cosmetic formulation, or a detergent formulation.

The following examples will make it possible to better understand the invention, though without limiting its scope.

EXAMPLES

Example 1

This example describes 5 polyurethanes implementing oxyethylated cardanols. These polyurethanes shall be subjected to various uses in the following examples.

Test No. 1

This test corresponds to a polyurethane resulting from the condensation of, expressed as a percentage by weight of each of the components:
84.7% polyethylene glycol whose molecular mass by weight is equal to 10,000 g/mol, 9.6% oxyethylated cardanol with 6 ethylene oxide units,
5.7% isophorone diisocyanate.

This polyurethane is formulated in water in the presence of a surface active agent sold under the name Simulsol™ Ox1008 by the company SEPPIC™ (ratio by weight: 30% PU, 20% Simulsol™ OX1008, 50% water).

Test No. 2

This test corresponds to a polyurethane resulting from the condensation of, expressed as a percentage by weight of each of the components:
85.3% polyethylene glycol whose molecular mass by weight is equal to 10,000 g/mol, 7.9% oxyethylated cardanol with 6 ethylene oxide units,
6.8% isophorone diisocyanate.

This polyurethane is formulated in water in the presence of a surface active agent sold under the name Simulsol™ Ox1008 by the company SEPPIC™ (ratio by weight: 30% PU, 20% Simulsol™ OX1008, 50% water).

Test No. 3

This test corresponds to a polyurethane resulting from the condensation of, expressed as a percentage by weight of each of the components:
83.8% polyethylene glycol whose molecular mass by weight is equal to 10,000 g/mol, 9.5% oxyethylated cardanol with 6 ethylene oxide units,
6.7% isophorone diisocyanate.

This polyurethane is formulated in water in the presence of a surface active agent sold under the name Simulsol™ Ox1008 by the company SEPPIC™ (ratio by weight: 30% PU, 20% Simulsol™ OX1008, 50% water).

Test No. 4

This test corresponds to a polyurethane resulting from the condensation of, expressed as a percentage by weight of each of the components:
80.8% polyethylene glycol whose molecular mass by weight is equal to 10,000 g/mol, 12.7% oxyethylated cardanol with 6 ethylene oxide units,
6.5% isophorone diisocyanate.

This polyurethane is formulated in water in the presence of a surface active agent sold under the name Simulsol™ Ox1008 by the company SEPPIC™ (ratio by weight: 30% PU, 20% Simulsol™ OX1008, 50% water).

Example 2

This example illustrates the use of inventive polyurethanes and the prior art, as thickening agents of a mat paint without solvent.

The composition of said paint is indicated in table 1, the masses of each component being indicated in grams. In the tests, the HEUR bases are formulated with surface active agents, but may also be dissolved in solvents or implemented in the form of powders. The thickeners all have a solids content of 30% by dry weight of the active ingredient.

TABLE 1

| Ingredients in the formulation of water-based paint | Masses (g) |
| --- | --- |
| Ecodis ™ P50 (a COATEX ™ dispersing agent) | 2.0 |
| Tego 1488 ™ (a TEGO ™ antifoaming agent) | 0.76 |
| Mergal K6N (a TROY ™ bactericide) | 1.0 |
| TiONa RL68 (TiO2 MILLENIUM ™) | 40.98 |
| Omyacoat ™ 850 OG (CaCO3 OMYA ™) | 66.51 |
| Durcal ™ 5 (CaCO3 OMYA ™) | 150.02 |
| Mowilith ™ LDM 1871 (a CLARIANT ™ binder) | 75.78 |
| NaOH | 0.82 |
| Tested polyurethane | 6.18 |
| Water | 155.95 |
| Total | 500.00 |

The viscosities resulting from various speed gradients are then determined:
low-gradient: Brookfield™ viscosity at 10 and 100 revolutions/minute, respectively abbreviated $\mu$ Bk 10 and $\mu$ Bk 100 (in mPa·s),
medium-gradient: Stormer viscosity, abbreviated $\mu$ S,
high-gradient: ICI viscosity, abbreviated $\mu$ I,
at moments T=0 and 24 hours.

As a reminder, in the field of water-based paints, a high viscosity at a high shear gradient translates into a good "dynamic" behavior: in practice, the paint's viscosity remains high enough during the step of application onto the substrate; the benefits may be a greater build (i.e. a deposited thickness) and a reduced propensity for splashing.

At the same time, a high viscosity at a low or medium shear gradient translates into a good "static" behavior: thus, good stability is ensured during their storage while avoiding the phenomenon of sedimentation and a limitation of the tendency to sag on a vertical substrate.

Tests A1, A2, A3, A4 respectively implement polyurethanes 1, 2, 3 and 4 according to the invention (INV) and test A5 implements Coapur™ 6050 (COATEX™), a HEUR thickener. The corresponding results appear in table 2.

TABLE 2

| | | test A1 INV | test A2 INV | test A3 INV | test A4 INV | test A5 PA |
| --- | --- | --- | --- | --- | --- | --- |
| $\mu_{B10}/\mu_{B100}$ | T = 0 | 12,500/1,670 | 12,200/1,870 | 17,200/2,800 | 16,200/2,400 | 15,900/2,420 |
| $\mu_S$ | | 81 | 85 | 95 | 95 | 90 |
| $\mu_I$ | | 0.5 | 0.5 | 0.6 | 0.6 | 0.5 |
| $\mu_{B10}/\mu_{B100}$ | T = 24 hours | 15,100/1,830 | 14,000/1,910 | 20,800/3,100 | 20,000/3,000 | 19,500/2,960 |
| $\mu_S$ | | 82 | 86 | 99 | 99 | 98 |
| $\mu_I$ | | 0.4 | 0.4 | 0.6 | 0.6 | 0.5 |

This table demonstrates that the inventive polyurethanes make it possible to effectively thicken a mat paint without solvent, regardless of the shear gradient. Furthermore, the polyurethane according to test A3 offers better performance that those of reference code A5.

Although the achieved viscosities are located in the same place as those measured for the reference, the observed variations depending on the synthesized structures demonstrate the possibility of developing a range of thickeners from such polyurethanes. These polyurethanes therefore constitute an effective alternative in terms of performance, and exhibit the advantage of having a natural-origin hydrophobic group.

Additionally, 2 pigment compatibility tests were carried out. In practice, if the paint exhibits insufficient pigment compatibility, it is observed that there is both a drop in the viscosity and a low tinting strength requiring a greater quantity of dye to achieve a certain level of tint. The result is too lightly tinted a paint film, which is lacking in evenness compared to the reference. This phenomena and maybe measured by the use of a spectrophotocolorimeter making it possible to measure the tri-chromatic coordinates (Huntsmann: L*, a*, b*), and therefore the color of a dry paint film.

The result is what is known to a person skilled in the art as a "rub-out test". It consists of applying without shear, with the help of a filmograph, 150 µm of the paint formulation onto a contrast card, i.e. slowly and without restrictions, and waiting 45 seconds, then applying a shear through rubbing the still-viscous paint film with the finger for 30 seconds in any place. After the film has dried, the colorimetric difference between the shear area (rubbed area) and the unsheared area (unrubbed film area) determined using a Spectro-pen spectrophotocolorimeter, makes it possible to assess (value of the ΔE) whether or not the composition of the tested paint exhibits good pigment compatibility.

The last 2 tests are carried out on a paint formulation 14 days old, into which 5% by weight of a black pigment is added, which is black Laconyl™ (BASF™).

The corresponding results appear in table 3.

thickeners all have a solids content of 30% by dry weight of the active ingredient. The paint is formulated according to methods well known to the person skilled in the art.

TABLE 4

| Ingredients in the formulation of water-based paint | Masses (g) |
|---|---|
| Ecodis ™ P50 (a COATEX ™ dispersing agent) | 4.0 |
| ByK ™ 34 (a BYK ™ antifoaming agent) | 1.0 |
| Mergal K6N (a TROY ™ bactericide) | 2.0 |
| TiONa ™ RL 68 (TiO2 MILLENIUM ™) | 80.13 |
| Omyacoat ™ 850 OG (CaCO3 OMYA ™) | 220.03 |
| Durcal ™ 2 (CaCO3 OMYA ™) | 300.1 |
| Texanol ™ 290 D (EASTMAN CHEMICALS ™ coalescence agent) | 10.0 |
| Acronal ™ 290 D (BASF ™ binder) | 130.0 |
| NaOH | 5.1 |
| Monoethylene glycol | 10.21 |
| Tested polyurethane | 16.5 |
| Water | 220.93 |
| Total | 1000 |

Test B1 implements polyurethane 1 according to the invention (INV) and test B5 implements Coapur™ 6050 (COATEX™). The corresponding results appear in table 5.

TABLE 5

|  |  | test B1 INV | test B5* PA |
|---|---|---|---|
| µB10/µB100 | T = 0 | 19,700/4,200 | 13,500/4,130 |
| µs |  | 110 | 110 |
| µI |  | 0.8 | 0.8 |

TABLE 3

|  |  | test A1 INV | test A2 INV | test A3 INV | test A4 INV | test A5 PA |
|---|---|---|---|---|---|---|
| µB10/B100µ | T = 14 days | 17,900/2,080 | 15,800/1,940 | 20,500/2,880 | 20,200/2,680 | 21,800/3,300 |
| µS |  | 90 | 90 | 101 | 100 | 103 |
| µI |  | 0.5 | 0.5 | 0.5 | 0.5 | 0.6 |
| µS | T = 14 days + | 15,900/1,760 | 15,300/1,700 | 16,500/2,030 | 15,500/2,000 | 13,500/1,600 |
| µI | pigment | 88 | 87 | 91 | 90 | 85 |
|  | black | 0.5 | 0.5 | 0.5 | 0.5 | 0.5 |
| ΔE |  | 1.5 | 2.2 | 7.0 | 7.0 | 9.4 |
| L* black background |  | 31.9 | 32.5 | 37.5 | 37.0 | 41.7 |
| L* white background |  | 31.5 | 32.7 | 37.5 | 37.1 | 41.8 |

These results demonstrated the excellent pigment compatibility provided by the inventive polyurethanes, at a level further improved in relation to the reference of the prior art: not only are the viscosity decreases lower according to the invention (both before and after the black dye is added), but also the L* values remain even lower, which results in a better tinting strength.

Example 3

This example illustrates the use of inventive polyurethanes and those of the prior art, as thickening agents of a mat paint with solvent.

The composition of said paint is indicated in table 4, the masses of each component being indicated in grams. The TABLE 5-continued

|  |  | test B1 INV | test B5* PA |
|---|---|---|---|
| µB10/µB100 | T = 24 hours | 19,500/4,280 | 1,300/4,250 |
| µS |  | 113 | 113 |
| µI |  | 0.8 | 0.8 |

This table demonstrates that the inventive polyurethane makes it possible to effectively thicken a mat paint without solvent, regardless of the shear gradient. At a low shear gradient (Brookfield™ viscosity at 10 revolution/minute) it is always more effective than with the prior art.

Table 6 shows the results of the pigment compatibility tests, after adding 5% by weight of black Laconyl™ pigment (BASF™) into paint that had aged for 1 month.

TABLE 6

|  |  | test B1 INV | test B5 PA |
|---|---|---|---|
| µB10/µB100 | T = 0 | 19,500/4,300 | 13,100/4,460 |
| µS | after adding | 113 | 114 |
| µI | the pigment | 0.8 | 0.8 |
| µB10/µB100 | T = 24 hours | 14,800/3,230 | 4,1207/1,350 |
| µS | after adding | 105 | 85 |
| µI | the pigment | 0.8 | 0.6 |
| ΔE |  | 9.5 | 9.7 |
| L* black background |  | 43.0 | 43.4 |
| L* white background |  | 42.1 | 43.3 |

These results confirm the very good pigment compatibility provided by the inventive polyurethane. The decreases in viscosity are lower according to the invention (both before and after adding the black dye) and therefore the viscosities remain higher.

The above written description of the invention provides a manner and process of making and using it such that any person skilled in this art is enabled to make and use the same, this enablement being provided in particular for the subject matter of the appended claims, which make up a part of the original description.

As used herein, the words "a" and "an" and the like carry the meaning of "one or more."

The phrases "selected from the group consisting of," "chosen from," and the like include mixtures of the specified materials. Terms such as "contain(s)" and the like are open terms meaning 'including at least' unless otherwise specifically noted. All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A water-soluble polyurethane resulting from the condensation of:
   a) oxyalkylated cardanol and a polyalkylene glycol, and
   b) at least one polyisocyanate,
   wherein said water-soluble polyurethane consists of polymerized units of said oxyalkylated cardanol, said polyalkylene glycol and said at least one polyisocyanate.

2. A polyurethane according to claim 1 which results from the condensation of, expressed as a % by weight of each of the monomers, the sum of these %s being equal to 100%:
   90% to 99.5% of oxyalkylated cardanol and a polyalkylene glycol, and
   0.5% to 10% of at least one polyisocyanate.

3. A polyurethane according to claim 1, wherein the polyalkylene glycol is polyethylene glycol.

4. A polyurethane according to claim 3, wherein the polyethylene glycol has a molecular mass of 2,000 g/mole-20,000 g/mole.

5. A polyurethane according to claim 3, wherein the polyethylene glycol has a molecular mass of 8,000 g/mole-12,000 g/mole.

6. A polyurethane according to claim 2, wherein the polyalkylene glycol is polyethylene glycol.

7. A polyurethane according to claim 6, wherein the polyethylene glycol has a molecular mass of 2,000 g/mole-20,000 g/mole.

8. A polyurethane according to claim 6, wherein the polyethylene glycol has a molecular mass of 8,000 g/mole-12,000 g/mole.

9. A polyurethane according to claim 1, wherein the polyisocyanate is selected from the group consisting of 1,4-butane di-isocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane and its mixture with 1-methyl-2,6-diisocyanatocyclohexane, the biuret of hexamethylene diisocyanate, the trimer of hexamethylene diisocyanate, the trimer of isophorone diisocyanate and mixtures thereof.

10. A polyurethane according to claim 1, wherein the oxyalkylated cardanol is oxyethylated with 1-100 ethylene oxide units.

11. A polyurethane according to claim 10, wherein the oxyalkylated cardanol is oxyethylated with 5-60 ethylene oxide units.

12. An aqueous composition comprising a polyurethane according to claim 1.

13. The aqueous composition comprising a polyurethane according to claim 12, wherein said composition is an aqueous paint, a lacquer, a varnish, a paper coating, a cosmetic formulation, or a detergent formulation.

14. A polyurethane according to claim 6, wherein the oxyalkylated cardanol is oxyethylated with 1-100 ethylene oxide units.

15. A polyurethane according to claim 14, wherein the oxyalkylated cardanol is oxyethylated with 5-60 ethylene oxide units.

16. A polyurethane according to claim 2, wherein said water-soluble polyurethane consists of polymerized units of oxyalkylated cardanol oxyethylated with 5-60 ethylene oxide units, polyethylene glycol having a molecular mass of 2,000 g/mole-20,000 g/mole, and isophorone diisocyanate.

17. A polyurethane according to claim 6, wherein the polyisocyanate is selected from the group consisting of 1,4-butane di-isocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane and its mixture with 1-methyl-2,6-diisocyanatocyclohexane, the biuret of hexamethylene diisocyanate, the trimer of hexamethylene diisocyanate, the trimer of isophorone diisocyanate and mixtures thereof.

18. A polyurethane according to claim 15, wherein the polyisocyanate is selected from the group consisting of 1,4-butane di-isocyanate, 1,6-hexane diisocyanate, isophorone diisocyanate, 1,3-cyclohexane diisocyanate, 1,4-cyclohexane diisocyanate, 4,4'diisocyanatodicyclohexylmethane, 1-methyl-2,4-diisocyanatocyclohexane and its mixture with 1-methyl-2,6-diisocyanatocyclohexane, the biuret of hexamethylene diisocyanate, the trimer of hexamethylene diisocyanate, the trimer of isophorone diisocyanate and mixtures thereof.

* * * * *